(12) United States Patent
Takase

(10) Patent No.: US 6,192,863 B1
(45) Date of Patent: Feb. 27, 2001

(54) COMMON-RAIL FUEL-INJECTION SYSTEM

(75) Inventor: Shigehisa Takase, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/537,096

(22) Filed: Mar. 29, 2000

(30) Foreign Application Priority Data

Apr. 2, 1999 (JP) .................................. 11-096901

(51) Int. Cl.$^7$ .................................. F02M 37/04
(52) U.S. Cl. .......................... 123/456; 123/357
(58) Field of Search .................. 123/357, 456, 123/497, 299, 300

(56) References Cited

U.S. PATENT DOCUMENTS

| | | | |
|---|---|---|---|
| 5,638,789 | * 6/1997 | Hayner | 123/357 |
| 5,713,326 | * 2/1998 | Huber | 123/299 |
| 5,771,861 | * 6/1998 | Musser et al. | 123/357 |
| 5,975,056 | * 11/1999 | Augustin et al. | 123/478 |
| 6,016,791 | * 1/2000 | Thomas et al. | 123/456 |
| 6,032,642 | * 3/2000 | Trumbower et al. | 123/299 |
| 6,065,449 | * 5/2000 | Fukuma | 123/436 |
| 6,102,009 | * 8/2000 | Nishiyama | 123/490 |
| 6,105,554 | * 8/2000 | Nishiyama | 123/436 |
| 6,119,656 | * 9/2000 | Schmidt | 123/456 |

FOREIGN PATENT DOCUMENTS

18068/2000    1/2000 (JP) .

\* cited by examiner

Primary Examiner—Carl S. Miller
(74) Attorney, Agent, or Firm—Browdy and Neimark

(57) ABSTRACT

Disclosed a common-rail fuel-injection system employing an auxiliary injection such as a pilot injection system, in which when a desired amount of fuel to be injected in the auxiliary injection is less than a set value, the feedback control ceases to keep the combustion against becoming unstable. When a desired amount of fuel to be injected in the auxiliary injection is proved on comparison at step 15 to be less than a minimum amount of fuel injected, which is the lower limit detectable according to both of the common-rail pressure and a pressure drop in the common-rail pressure owing to the fuel injection, the minimum amount of fuel injected serves on step 18 as a corrected, desired amount of fuel to be injected in the auxiliary injection. Thus, the fuel injection is achieved in accordance with the corrected, desired amount of fuel to be injected in the auxiliary injection, thereby keeping the feedback control at the auxiliary injection from becoming unstable. As an alternative, the minimum amount of fuel injected may be replaced with a set value, which is defined on the basis of the minimum amount of fuel injected.

5 Claims, 5 Drawing Sheets

COMMON-RAIL FUEL-INJECTION SYSTEM

BACKGROUND OF THE INVENTION

1. Field of the Invention

The present invention relates to a common-rail fuel-injection system and more particularly a common-rail fuel-injection system in which, on fuel injection into a combustion chamber, an auxiliary injection of a small amount of fuel is provided at any timing of soon before or after a main injection of major amount of fuel.

2. Description of the Prior Art

Among various types of fuel-injection systems for engines is conventionally well-known a common-rail fuel-injection system in which a high-injection pressure is maintained in the fuel discharge lines, and fuel-injection conditions such as a timing of fuel injection and an amount of fuel to be injected or injected are controlled depending on operating requirements of the engine. In accordance with the common-rail fuel-injection system, the fuel intensified in pressure by a fuel pump is stored in a common rail at desired pressures, and is injected into the combustion chambers through the injectors, which are arranged to the engine cylinders, each to each cylinder, with the fuel-injection conditions such as an amount of fuel to be delivered and a timing of fuel injection, which are regulated by a controller at the most suitable situations for the engine operating requirements.

A fuel pressure to ensure the injection pressure is maintained constantly in the fuel discharge lines extending from the common rail through injection lines to discharge orifices, which are formed at the distal ends of the injectors that are each provided with a solenoid valve to block or allow the discharge of fuel applied via the injection lines. The controller is to regulate both the fuel pressure in the common rail and the solenoid valves in the injectors to spray the high-pressure fuel out of the injectors under the desired fuel-injection conditions, which are the most suitable for the engine operating requirements. Of these common-rail fuel-injection systems, there is a type in which the actuation of the solenoid valves makes use of a part of the high-pressure fuel as a working fluid to operate the injectors.

An example of a conventional common-rail fuel-injection system will be explained below with reference to FIG. 5. A fuel feed pump 6 draws fuel from a fuel tank 4 through a fuel filter 5 and forces it under a preselected intake pressure to a high-pressure, fuel-supply pump 8 of, for example, a variable stroke plunger type, through a fuel line 7. The high-pressure, fuel-supply pump 8 is driven by the output of the engine, which intensifies the fuel to a high pressure desired depending on the engine operating requirements, and supplies the pressurized fuel into the common rail 2 through another fuel line 9. The fuel-supply pump 8 is also provided with a fuel flow-rate control valve 14, where the fuel pressure in the common rail 2 is maintained at the preselected high-pressure level. The fuel relieved from the fuel-supply pump 8 is allowed to flow back the fuel tank 4 through a fuel-return line 10. The fuel, thus supplied, is stored in the common rail 2 at the preselected high pressure and forced to the injectors 1 through injection lines 3. The unconsumed fuel remaining in each injector 1 out of the fuel fed through the injection lines 3 into the injectors 1 may return to the fuel tank 4 through a fuel-recovery line 11.

The controller 12 of an electronically-controlled unit is applied with various signals of sensors monitoring the engine operating conditions, such as a cylinder-identification sensor, a crankshaft position sensor for detecting the engine rpm Ne and top dead center TDC, a throttle-position sensor depending on the depression Ac of an accelerator pedal, an engine coolant temperature sensor, an intake manifold pressure sensor and the like. The controller 12 is also applied with a detected single as to a fuel pressure in a common-rail 2, or a common-rail pressure, which is reported from a pressure sensor 13 installed in the common rail 2. The controller unit 12 may regulate the fuel injection conditions on the injectors 1 such as the injection timing (the instant the injection starts and the duration of injection) and the amount of fuel injected or the others, depending on the signals issued from the sensors, to thereby operate the engine with the engine output, which is the most suitable for engine operating requirements. Although the injection of fuel out of the injectors 1 consumes the fuel in the common rail 2, resulting in lowering the fuel pressure in the common rail 2, the controller unit 12 actuates the fuel flow-rate control valve 14 of the fuel supply-pump 8, which in turn regulates the quantity of delivery of the fuel from the high-pressure, fuel-supply pump 8 to the common rail 2 whereby the common-rail pressure recovers the preselected fuel pressure or ensures the fuel pressure that might be desired in accordance with the engine operating requirements.

The injector 1 constructed as shown in FIG. 6 is installed through a hermetic sealing member in a port bored in a basement such as a cylinder head. The injector 1 is communicated at an upper section thereof with the associated injection line 3 through a high-pressure fuel inlet coupling 30. The injector 1 is made therein with fuel passages 21, 22 comprising a fuel-flow line in combination with the associated injection line 3. The high-pressure fuel applied via the fuel passages 21, 22 is allowed to reach a discharge orifice 25 through a fuel sac 23 and a clearance around the needle valve 24. Thus, the instant the needle valve 24 is lifted to open the discharge orifice 25, the fuel is injected out of the discharge orifice 25 into the combustion chamber.

The injector 1 is provided with a needle-valve lift mechanism of pressure-control chamber type in order to adjust the lift of the needle valve 24. The injector 1 has at the head section thereof a solenoid-operated actuator 26 comprising a solenoid valve. A solenoid 28 of the solenoid-operated actuator 26 is applied with a control current through a signal line 27, depending on a command pulse issued from the controller 12. Upon energizing the solenoid 28, an armature 29 is lifted to open a valve 32 arranged at one end of a fuel path 31, so that the fuel pressure of fuel fed in a pressure-control chamber 30 via the fuel passages is relieved through the fuel path 31. A control piston 34 is arranged for axial linear movement in an axial recess 33 formed in the injector 1. As the resultant force of the reduced fuel pressure in the pressure-control chamber 30 with the spring force of a return spring 35, acting on the control piston 34 to push it downward, is made less than the upward force exerted on the control piston 34 owing to the fuel pressure acting on a tapered surface 36 exposed to the fuel sac 23, the control piston 34 moves upwards. As a result, the needle valve 24 lifts to allow the fuel to spray out of the discharge orifice 25. It will be understood that a timing of fuel injection is defined by the instant the needle valve 24 starts lifting while the amount of fuel injected per cycle is defined dependent on the fuel pressure in the fuel passages and both the amount and duration of lift of the needle valve 24.

It is commonly found that the relation of the amount of fuel injected out of the injector 1 with the pulse width of command pulse issued from the controller 12 is mapped or plotted for various choices of a parameter: the common-rail pressure Pr. With the common-rail pressure Pr being at constant, the amount of fuel injected increases in proportion to the command pulse becoming large in pulse width. In contrast, on the pulse width being kept at constant, the higher the common-rail pressure Pr is, the greater is the amount of fuel injected per cycle. On the other hand, the fuel injection usually starts or ceases with a fixed time lag after the fall time and rise time of the command pulse. Thus, the injection timing may be controlled by regulating the timing the command pulse is turned on or off. The amount of fuel injected per combustion cycle may be found or calculated, depending on the engine operating requirements, on the basis of a characteristic map of the fundamental amount of fuel injected, in which a fixed relationship of the fundamental amount of fuel injected per cycle with the rpm of the engine has been previously mapped for various choices of a parameter: an amount of depression of the accelerator pedal.

In conventional diesel engines, a fuel injection system commonly referred to as pilot injection control is employed, in which a small amount of fuel is injected prior to the major injection to previously heat up the combustion chamber, thereby keeping the combustion chamber against too sudden firing of the charged fuel, which might otherwise trend to cause what is called the diesel knock as well as to increase the amount of nitrogen oxides contained in the exhaust gases. If considering the significance of the pilot injection system, the minor amount of fuel in the pilot injection should be determined with taking into account an exhaust amount of nitrogen oxides, which has been found experimentally. However, the minor amount of fuel in pilot injection determined as described just above makes possibly the combustion so slow as to cause the adverse influence such as surging or the like. Although but the pilot injection is usually desired when the engine is operated in an operating range of partial load or idling, the minor amount of fuel in pilot injection commonly is determined at a fixed proportion to the whole amount of fuel injected or is an absolute amount that is determined indiscriminately. Thus, the minor amount of fuel in pilot injection is in general too small in the proportion to the whole amount of fuel injected as well as in absolute value.

In the meantime, the injection characteristics such as the injection timing, the amount of fuel injected or the like are inevitably somewhat different among the injectors and also vary on even the same injector owing to aging. It is thus common that the injectors show some scatter in the amount of fuel injected at every injector even if the injectors are kept identical with each other in the common-rail pressure and the duration of command pulse made turned-on to actuate the associated injector. If the amount of fuel to be injected per cycle were too much, somewhat variations in the amount of fuel at every injection would not become a major problem. Nevertheless, a minute amount of fuel injected as in the pilot injection experiences the considerable influence of variations at every injector and/or due to aging. Eventually, there is the possibility of too much amount of fuel injected or failure of fuel injection. Under partial-load operation or non-load idling, where the pilot injection is desired, if the injectors having succeeded in pilot injection intermingle with other injectors having failed in pilot injection, it makes the combustion unstable and causes an uncomfortable ride.

To reduce the variations in the amount of fuel injected, which might occur among the injectors, a control system according to a senior invention disclosed in Japanese Patent Laid-Open No. 2000-18068 has been proposed, in which an actual amount of fuel injected is calculated on the basis of a pressure drop in the common rail at the time of fuel injection, and a controlled variable is corrected so as to coincide with a desired amount of fuel to be injected, which is found depending on the engine operating requirements. In accordance with the controlling system of the senior invention, the actual amount of fuel injected may be derived from the mapped data correspondingly to both of the common-rail pressure just before the fuel injection and the pressure difference between the common-rail pressure just before the fuel injection and that just after the fuel injection. That is to say, a common-rail fuel-injection system has been proposed, in which an actual amount of fuel injected is found by making use of a signal issued from the pressure sensor, which is installed to monitor the common-rail pressure. In the control system of the senior co-pending application, a dynamic fuel leakage out of a pressure-control chamber of the injector to carry out the fuel injection is considered when finding the actual amount of fuel injected per cycle.

In the map explaining the correlation between the pressure drop in the common rail and the amount of fuel injected, there is an area where the actual amount of fuel injected can not be obtained with accuracy in accordance with only the pressure drop in the common rail. As apparent from a graphic representation of FIG. 2 showing the correlation between the amount of fuel injected and the pressure drop in the common rail, which is plotted for the various choices of a parameter: the common-rail pressure, the relationship between the amount Q of fuel injected and the common-rail pressure Pr becomes indefinite at the pressure drop below a threshold value $\Delta Ps$, for example, 1 Mpa in the common rail. Thus, it is substantially impossible to calculate the actual amount of fuel injected in compliance with the pressure drop below the threshold value $\Delta Ps$ in the common rail. That is to say, no actual amount of fuel injected is obtained accurately corresponding to the pressure drop below the threshold value $\Delta Ps$ shown in FIG. 2 in the common rail and, therefore, it is very tough to accomplish the feedback control with accuracy to make the actual amount of fuel injected coincide with a desired amount of fuel to be injected.

In the common-rail fuel-injection system in which an auxiliary fuel injection of a small amount of fuel is provided at any timing either soon before or after a main injection of major amount of fuel, and a controller calculates a desired minor amount of fuel to be injected at the auxiliary fuel injection out of an injector into a combustion chamber while the auxiliary fuel injection is feedback controlled such that the actual minor amount of fuel injected really in the auxiliary fuel injection comes in accord with the desired minor amount of fuel to be injected, therefore, it has been necessary to eliminate such adverse situation that a control variable for the amount of fuel injected becomes unstable when the desired minor amount of fuel to be injected at the auxiliary fuel injection is less than a critical amount of fuel injected, which is obtainable on the basis of the pressure drop in the common-rail pressure.

SUMMARY OF THE INVENTION

A primary object of the present invention is to provide a common-rail fuel-injection system in which a fuel discharged out of a high-pressure fuel pump is stored in a common rail, the fuel fed from the common rail is injected out of injectors into combustion chambers, and a controller regulates the fuel injection out of the injectors in accordance with a desired amount of fuel to be injected, which is found depending on signals reported from means for monitoring engine operating requirements, the improvement wherein when a desired amount of fuel to be injected in the auxiliary injection is proved to be less than a minimum amount of fuel injected, which is the lower limit detectable correspondingly to the common-rail pressure, the feedback control of the fuel injection at the auxiliary injection is kept against becoming unstable whereby the exhaust gases performance and noise control may be prevented from becoming worse owing to the failure of normal feedback control in the auxiliary injection.

The present invention is concerned with a common-rail fuel-injection system comprising, a common rail storing therein a pressurized fuel discharged out of a high-pressure fuel pump, injectors for spraying the fuel fed from the common rail into combustion chambers, detecting means for monitoring engine operating conditions, a pressure sensor for monitoring a fuel pressure in the common rail, and a controller for finding a desired amount of fuel to be injected out of the injectors depending on signals from the detecting means and controlling fuel injection out of the injectors in accordance with the desired amount of fuel to be injected, wherein the controller divides the fuel injection out of the injectors into a major injection and an auxiliary injection in accordance with the signals issued from the detecting means, the auxiliary injection being carried out at any one timing either before or after the major injection, finds the desired amount of fuel to be injected in the auxiliary injection in accordance with the signals issued from the detecting means, and further finds an actual minor amount of fuel injected really in the auxiliary injection on the basis of a pressure drop of the fuel pressure in the common rail, whereby the actual minor amount of fuel injected in the auxiliary injection is feedback controlled so as to come into coincidence with the desired amount of fuel to be injected in the auxiliary injection, and wherein the controller compares the desired amount of fuel to be injected in the auxiliary injection with a set value, which is found in accordance with the fuel pressure detected at the pressure sensor, and when the desired amount of fuel to be injected in the auxiliary injection is less than the set value, ceases the feedback control.

In one aspect of the present invention, the controller divides the fuel injection out of the injectors into a major injection and an auxiliary injection in compliance with the signals reported from the detecting means sensing the engine operating conditions, the auxiliary injection being carried out at any one timing either before or after the major injection, and calculates the desired amount of fuel to be injected in the auxiliary injection, which is a part of the whole desired amount of fuel to be injected per one combustion cycle, in accordance with the signals issued from the pressure sensor for monitoring the fuel pressure in the common rail. In case where the desired amount of fuel to be injected in the auxiliary injection is much enough and therefore the actual amount of fuel injected really in the auxiliary injection is detectable in accordance with the pressure drop of the fuel pressure in the common-rail resulting from the fuel injection out of the injectors, the controller carries out the feedback control of the auxiliary injection so as to make the actual amount of fuel injected coincide with the desired amount of fuel to be injected.

In contrast, if the desired amount of fuel to be injected in the auxiliary injection is not enough to detect the actual amount of fuel injected, the feedback control of the auxiliary injection, which is apt to become unstable, is stopped to keep the exhaust gases performance and noise control from becoming worse owing to the failure of normal feedback control in the auxiliary injection.

According to another aspect of the present invention there is provided a common-rail fuel-injection system, wherein the set value for an amount of fuel to be injected is calculated on the basis of a relationship defined previously between the fuel pressure in the common rail and a minimum amount of fuel injected, which is detectable in response to a pressure variation taking place in the fuel pressure in the common rail, and defined as an amount of fuel to be injected, which is not less than the minimum amount of injected fuel found depending on a signal issued from the pressure sensor.

Accordingly, there is no desired amount of fuel to be injected in the auxiliary injection defined less than the minimum amount of fuel injected, which is detectable on the pressure drop of the fuel pressure in the common rail. The actual amount of fuel injected, as brought closer to the desired amount of fuel defined as described just above, may be naturally derived from the data as to the fuel pressure in the common rail detected at the pressure sensor, so that the auxiliary injection may be feedback controlled without becoming unstable.

The relationship between the fuel pressure in the common rail and the minimum amount of fuel injected is defined correspondingly to the minimum pressure drop detectable on the fuel pressure in the common rail, on the basis of the correlation among the fuel pressure in the common rail just before the fuel injection, the pressure drop of the fuel pressure in the common rail caused by the fuel injection and the amount of fuel injected in the fuel injection.

Specifically, the relationship between the pressure drop of the fuel pressure in the common rail due to the fuel injection and the amount of fuel injected is previously given in the form of a mapped data for various choices of the parameter: the fuel pressure in the common rail just before the fuel injection. Thus, the relationship between the minimum amount of fuel injected and the common-rail pressure may be found correspondingly to the minimum pressure drop of the fuel pressure, which is detectable at the pressure sensor.

If the desired amount of fuel to be injected in the auxiliary injection were less than the set value, the open-loop control would be achieved in which the desired amount of fuel to be injected serves as the set value. In other words, when the desired amount of fuel to be injected in the auxiliary injection is less than the set value, the open-loop control with no feedback as to the actual amount of fuel injected is executed instead of the feedback control carried out according to the deviation between the desired amount of fuel to be injected and the actual amount of fuel injected.

In accordance with another aspect of the present invention a common-rail fuel-injection system is provided, wherein the injector includes a pressure-control chamber applied with a part of the fuel fed from the common rail, a needle valve movable upward and downward, depending on a hydraulic action of the fuel in the pressure-control chamber, to thereby open and close fuel-discharge orifices at a distal end of the injector, a valve for allowing the fuel to discharge out of the pressure-control chamber thereby relieving the fuel pressure in the pressure-control chamber, and an actuator for driving the valve. As the controller energizes the actuator, the valve is made open to discharge the fuel applied to the pressure-control chamber from the common rail, thereby relieving the fuel pressure in the pressure-control chamber. Reducing the fuel pressure in the pressure-control chamber makes the needle valve lift under the action of the fuel pressure to open the discharge orifices, which is provided at the distal end of the injector, whereby the fuel is allowed to spray into the combustion chamber.

In accordance with a further another aspect of the present invention a common-rail fuel-injection system is disclosed, wherein the controller outputs a command pulse controlling an exciting pulse that is applied to the actuator to open the valve, and corrects a pulse width of the command pulse depending on a deviation between the actual amount of fuel injected in the auxiliary injection and the desired amount of fuel to be injected in the auxiliary injection to thereby execute the feedback control of the auxiliary injection. A specific example of the fuel-injection control corrects the desired amount of fuel to be injected in the next fuel injection for the same injector, thereby find the corrected, desired amount of fuel to be injected. Then, the pulse width of the command pulse is altered correspondingly to the corrected, desired amount of fuel to be injected, so that actual amount of fuel to be injected at the next auxiliary injection is controlled to come into coincidence with the corrected, desired amount of fuel to be injected.

According to the common-rail fuel-injection system constructed as described above, the fuel discharged out of the high-pressure fuel pump is stored in the common rail and the fuel fed from the common rail is injected out of the injectors into the combustion chambers, while the controller regulates the fuel injection out of the injectors in accordance with the desired amount of fuel to be injected, which is found depending on signals reported from means for monitoring engine operating requirements. When the desired amount of fuel to be injected in the auxiliary injection is less than the set value, which is defined correspondingly to the common-rail pressure, the feedback control ceases and therefore the feedback control of the fuel injection at the auxiliary injection is kept against becoming unstable whereby the exhaust gases performance and noise/vibration control may be prevented from becoming worse because of difference in injection characteristics among the injectors and aging of injectors.

Moreover, the fuel-injection control for the common-rail fuel-injection system is not ordinarily executed but may be used for temporary machine learning or diagnosis whether the individual injectors become inferior due to aging.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DESCRIPTION OF THE PREFERRED EMBODIMENTS

A preferred embodiment of a common-rail fuel-injection system according to the present invention will be explained in detail hereinafter with reference to the accompanying drawings.

Figure 5:
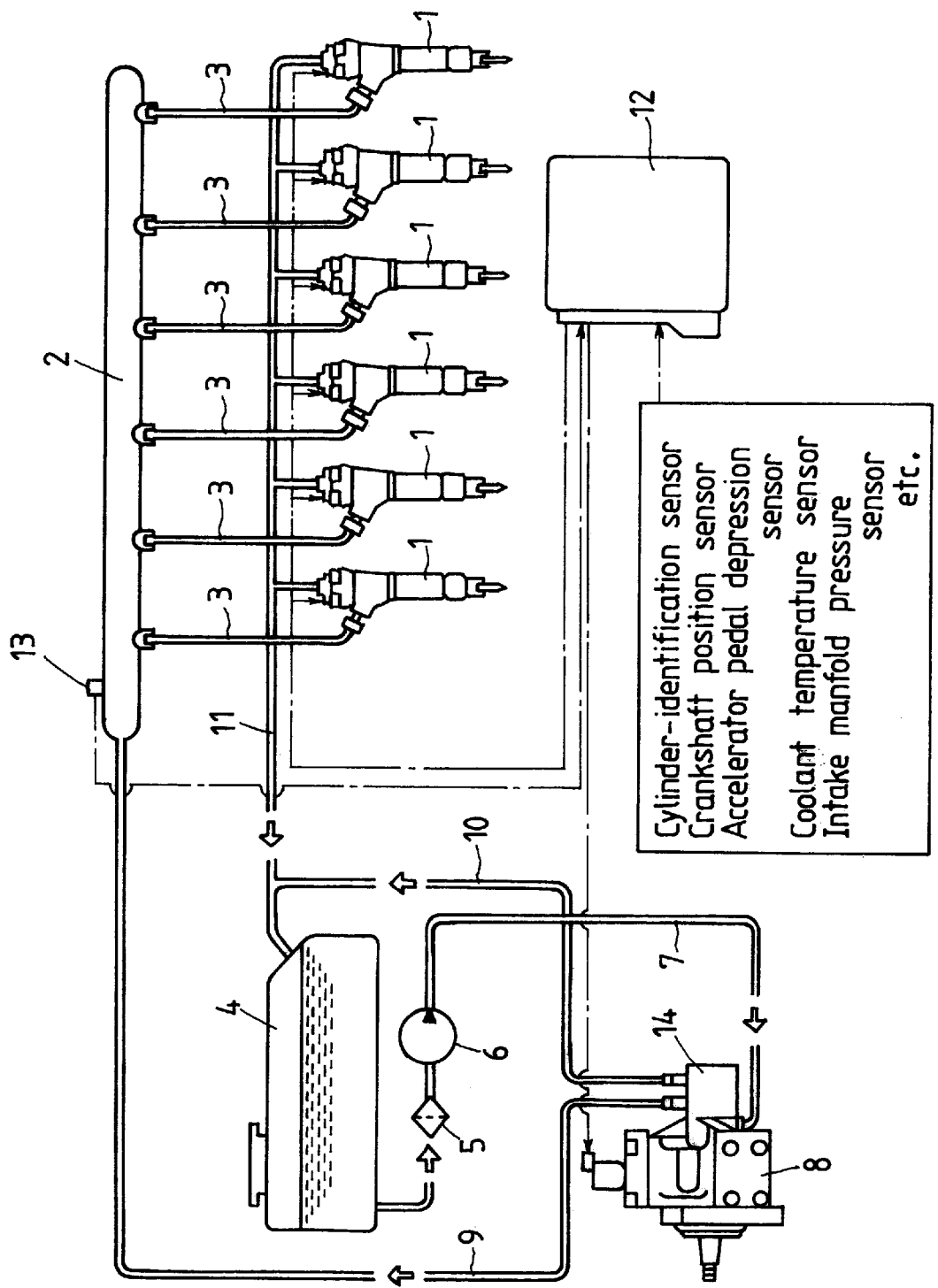
FIG. 5 is a schematic illustration of an arrangement of a conventional common-rail fuel-injection system.
Figure 6:
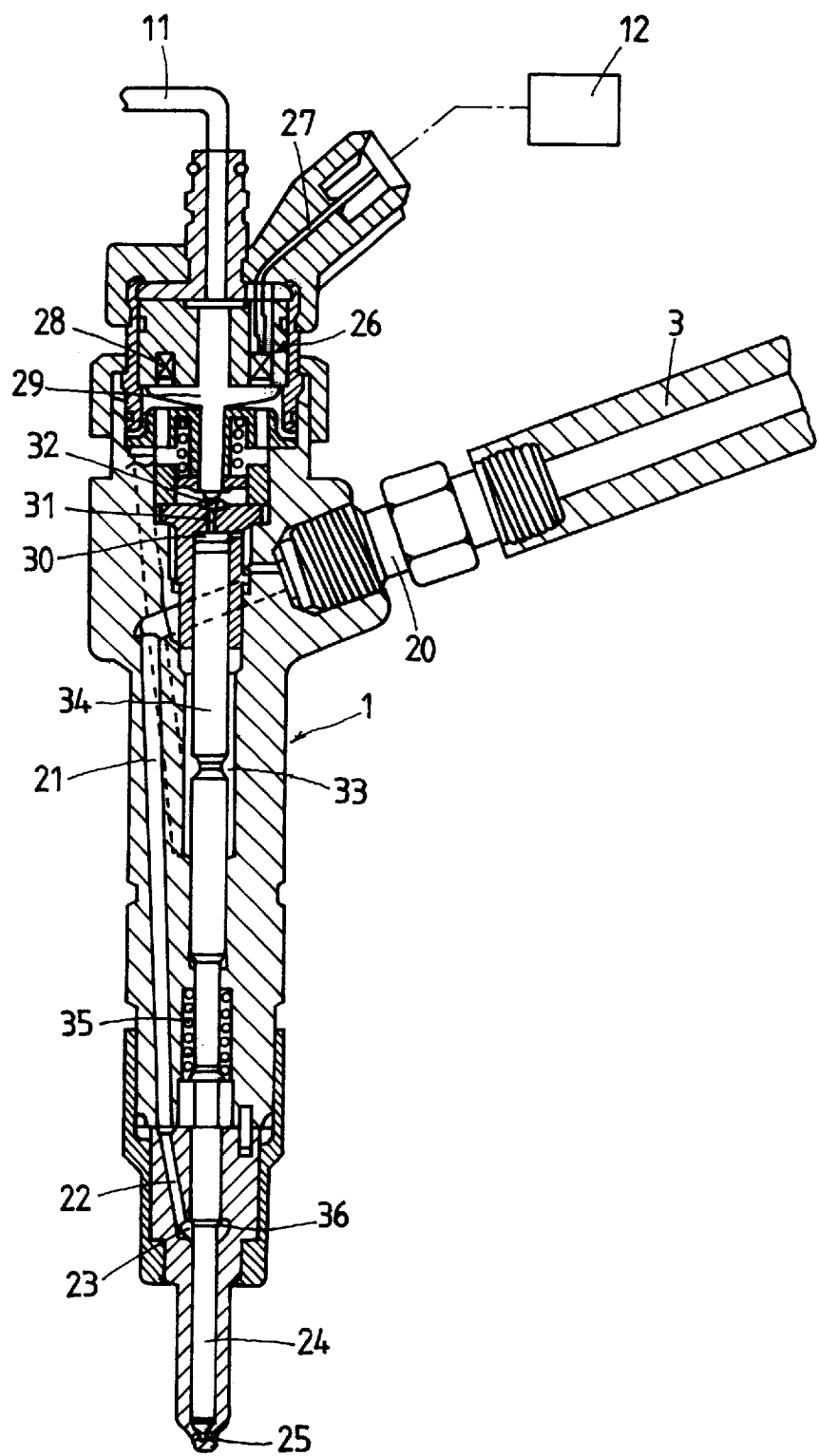
FIG. 6 is an axial section showing an example of an injector incorporated in the common-rail fuel-injection system shown in FIG. 5.

The common-rail fuel-injection system and injectors in FIGS. 5 and 6 are applicable to the system according to the present invention. The injector 1 is comprised of a pressure-control chamber 30 into which are applied a part of fuel supplied from a common-rail 2, a needle valve 24 moving up and down in accordance with a hydraulic pressure in the pressure-control chamber 30 to open and close discharge orifices 25, which are provided at the distal end of the injector 1 to spray fuel out of the injector, a valve 32 for delivering the fuel from the pressure-control chamber 30 to relieve a fuel pressure in the pressure-control chamber 30, and an actuator 26 operating the valve 32. Thus, most of components of the system are the same as previously described in connection with the injector 1 of FIG. 6, so that the previous description will be applicable.

The common-rail pressure Pr begins pressure drop with a time lag after the start of the fuel injection, in correspondence to the fuel injection for every cylinder in the engine operating cycle, and after the end of the injection, recovers by virtue of the fuel delivered out of the high-pressure pump 8 for providing the fuel injection at any cylinder, in which the next combustion is to be carried out in accordance with the firing order of the engine. This sequence repeats as to the common-rail pressure Pr. The engine in FIG. 5 is a multi-cylinder engine, in which the fuel injection out of the injector 1 is controlled independently for every cylinder.

Figure 1:
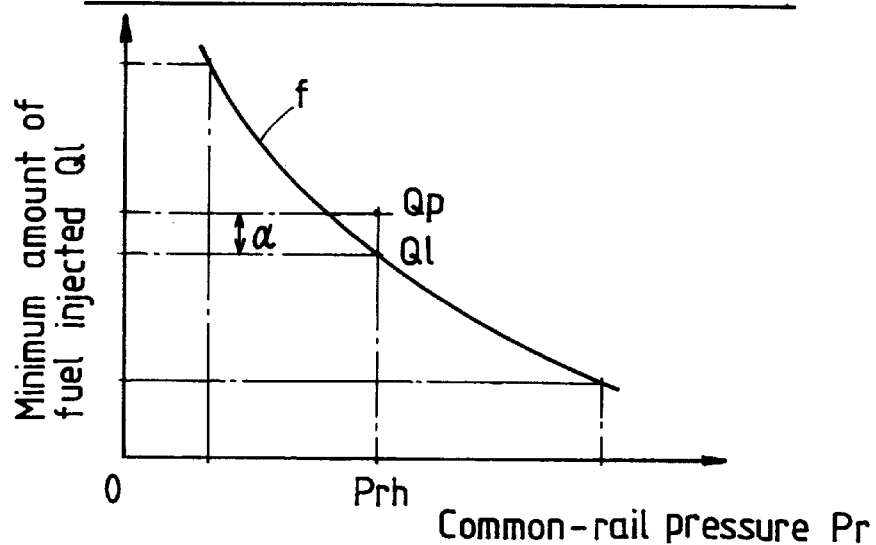
FIG. 1 is a graph showing relationship of common-rail pressure vs. minimum amount of fuel injected, which is detectable on the lower limit of the common-rail pressure drop, in a common-rail fuel-injection system according to the present invention.

First referring to FIG. 1, the fuel pressure Pr in the common rail is plotted as abscissa and the minimum amount Ql of fuel injected, which is detectable on the pressure drop in the common-rail pressure, as ordinate. A curve f in the graph of FIG. 1 explains that the minimum amount Ql of fuel injected, which is detectable on the pressure drop in the common-rail pressure, varies depending on the magnitude of the common-rail pressure Pr. That is to say, the higher the common-rail pressure Pr is, the less becomes the detectable minimum amount Ql of fuel injected. In contrast, the lower is the common-rail pressure Pr, the larger is the detectable minimum amount of fuel injected. It will be thus understood that FIG. 1 demonstrates the detectable minimum amount of fuel injected varies in compliance with the common-rail pressure Pr.

Figure 2:
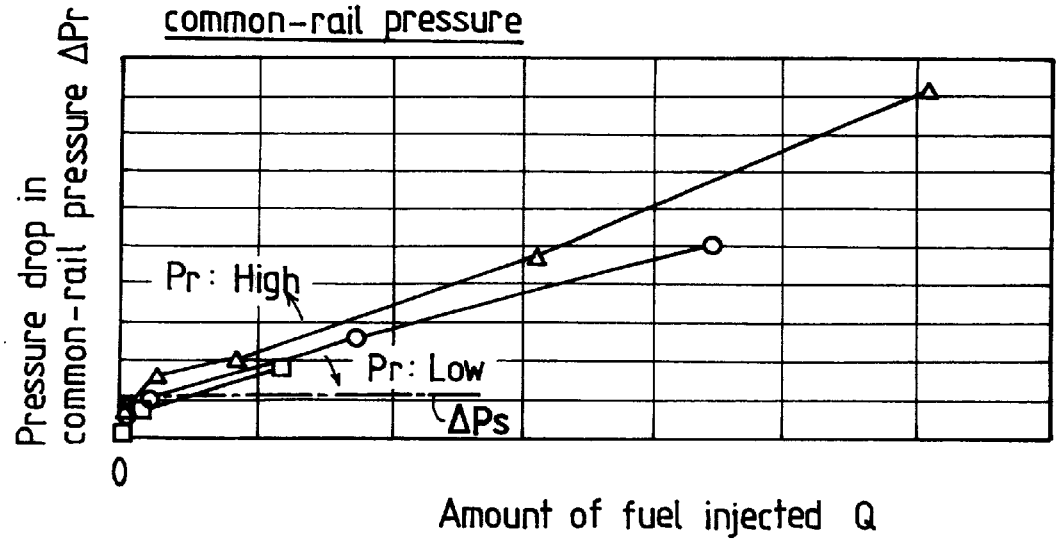
FIG. 2 is a graphic representation illustrating relationship of amount of fuel injected vs. pressure drop in common rail, which is plotted for various choices of a parameter: common-rail pressure, in a common-rail fuel-injection system according to the present invention.

FIG. 1 may be derived from FIG. 2 showing relationship of the amount Q of fuel injected vs. the pressure drop $\Delta Pr$ in the common-rail pressure in the common-rail fuel-injection system according to the present invention, which is plotted for various choices of a parameter: the common-rail pressure Pr just before the fuel injection detected by a pressure sensor 13 installed in the common rail 2. Even if the injection duration in the injector 1 is kept constant, the higher the common-rail pressure Pr is, the more the amount Q of fuel injected becomes. In contrast, with the same common-rail pressure Pr just before the fuel injection, the pressure drop $\Delta Pr$ in common-rail pressure varies in positive proportion to the amount Q of fuel injected. Moreover, when the amount Q of fuel injected is at constant, the higher the common-rail pressure Pr is, the greater the pressure drop $\Delta Pr$ in the common-rail pressure is. There is a threshold value $\Delta Ps$ that is recognized as a lower limit on which the amount of fuel injected is detectable. Thus, the minimum amount Ql of injected fuel found on the threshold value $\Delta Ps$ varies in compliance with the common-rail pressure Pr. This correlation is explained in the graph of FIG. 1.

In the fuel injection system in which an auxiliary fuel injection is carried out soon either before or after a major fuel injection, were a desired amount Qt of fuel to be injected in the auxiliary injection calculated as an amount less than the minimum amount Ql of the fuel injected found on the curve f of FIG. 1 in accordance with the common-rail pressure Pr just before the auxiliary fuel injection, the actual amount Qa of fuel injected really in the auxiliary injection would be made a value below the curve f. This makes it impossible to derive accurately the actual amount Qa of fuel injected in the auxiliary injection on the basis of both of the common-rail pressure Pr and the pressure drop $\Delta Pr$ thereof, and consequently the controlled variable for the amount of fuel injected tends to become unstable in the feedback control with the result of unsteady combustion. That is to say, in the pilot injection system in which the auxiliary injection is provided just before the major injection, the amount of fuel injected in the auxiliary injection is inherently too small to detect accurately the actual amount of fuel injected on the basis of the pressure drop $\Delta Pr$ in the common-rail pressure Pr so that it becomes more tough to keep the pilot injection steady.

Accordingly, on comparison of the desired amount Qt of fuel to be injected in the auxiliary injection found depending on the engine operating requirements with a set value for the amount of fuel in fuel injection determined in accordance with the common-rail pressure Pr detected at the pressure sensor just before the start of auxiliary injection, when the desired amount Qt of fuel to be injected is proved to be above the set value, the pressure drop in the common-rail pressure Pr becomes large enough to detect the actual amount Qa of fuel injected in the auxiliary injection, which will be above the minimum amount Ql of fuel injected. This helps ensure the stable feedback control of the auxiliary injection, in which the actual amount Qa of fuel injected is brought into coincidence with the desired amount Qt of fuel to be injected. In contrast, even if the desired amount Qt of fuel to be injected in the auxiliary injection is less than the set value for the amount of fuel injected, the method of control for the auxiliary injection may be changed over from the feedback control to, for example, the open-loop control. Although but the set value may be the minimum amount Qt alone, it is preferable that the set value Qp is given by adding an arbitrary value a to the minimum amount Qt of fuel injected.

Yet the graph of FIG. 1 is shown in accordance with the data of finite points given experimentally, and the minimum amount Qt of fuel injected is usually obtained by either the process of interpolation on the basis of a line graph linking any adjoining finite points or by an approximate curve joining the finite points.

The controller 12 issues a command pulse to control a signal to energize the actuator 26, which in turn makes the valve 32 open. As the controller 12 stores a mapped data of correlated relations that have been previously defined among common-rail pressures Pr just before the start of the fuel injection, command pulse widths and amounts of fuel injected. Thus either of the desired amount Qt of fuel to be injected in the auxiliary injection found in accordance with the engine operating requirements and the command pulse width found according to the common-rail pressure Pr detected at the pressure sensor 13 just before the fuel injection may be determined on the mapped data.

Figure 3:
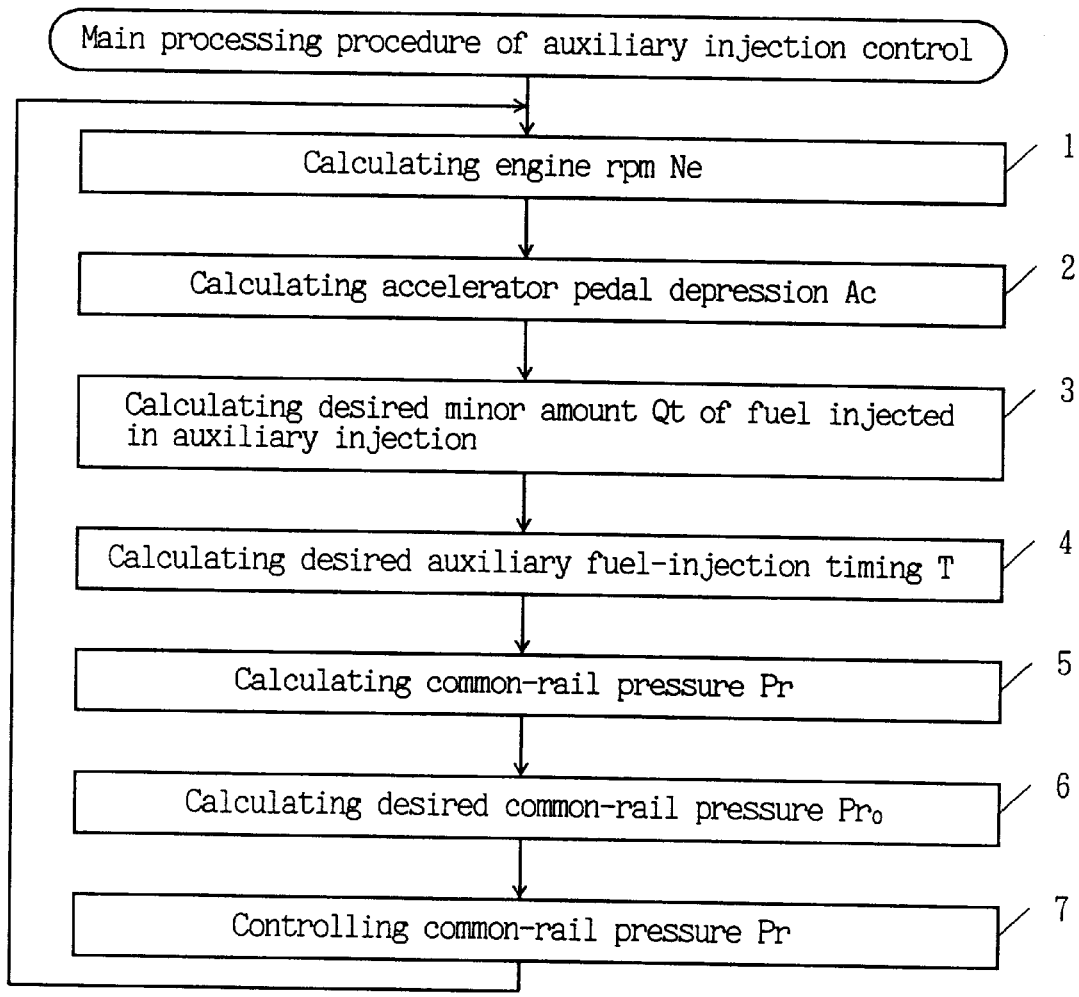
FIG. 3 is a flowchart illustrating a main routine procedure for auxiliary injection control in the common-rail fuel-injection system according to the present invention.

The fuel-injection control on the common-rail fuel injection system constructed as described above will be explained in detail hereinafter with reference to FIGS. 3 and 4. For monitoring the engine operating conditions, there are provided a rpm sensor for detecting the rpm Ne of the engine, and a sensor for detecting depression Ac of an accelerator pedal to recognize an engine load. It is to be noted that the processing steps for fuel-injection control will be hereinafter referred to as a letter "S". Referring to FIG. 3, an engine rpm Ne out of the engine operating conditions is first reported from the rpm sensor (S1) while an accelerator pedal depression Ac representing an engine load is reported from the accelerator pedal sensor (S2). In accordance with the engine rpm Ne and the accelerator pedal depression Ac obtained at the steps 1 and 2 described above, a desired amount Qt of fuel to be injected in the auxiliary injection per cycle and a desired timing T of the auxiliary fuel injection are found by referring to a mapped data, not shown, defined previously (S3 and S4). A common-rail pressure Pr is calculated based on sampling signals detected at the pressure sensor 13 (S5). A desired common-rail pressure Pro is determined, which is necessary for generating the desired amount Qt of fuel to be injected in the auxiliary injection, which has been found at the step 3 (S6). The common-rail pressure Pr is controlled so as to come into the desired common-rail pressure $Pr_0$ by regulating a ratio of defining the open and the closure of the flow-rate control valve 14 in the high-pressure fuel pump 8, for example, a duty ratio of the solenoid-operated valve (S7).

Figure 4:
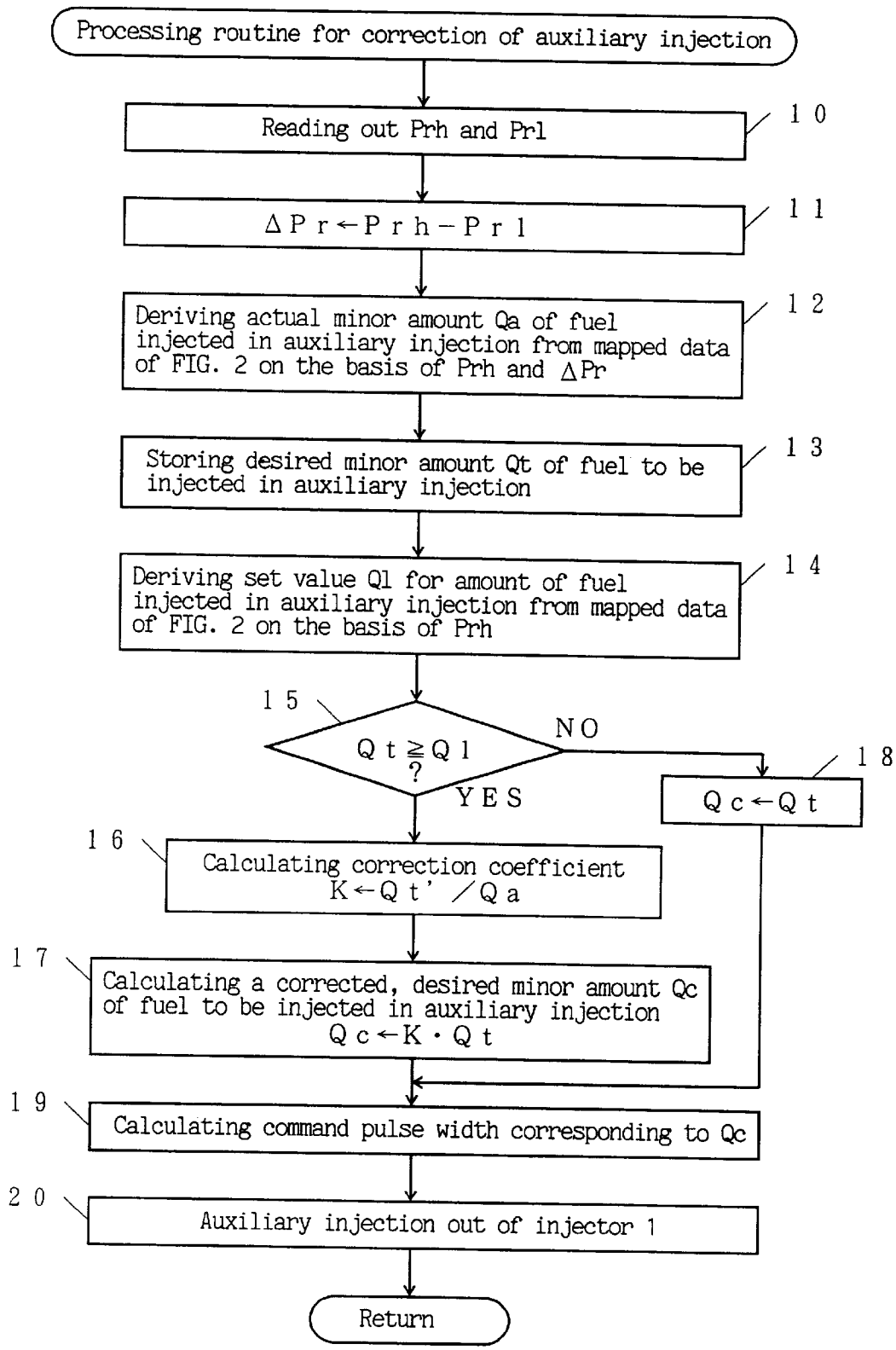
FIG. 4 is a flowchart illustrating a correction control routine for auxiliary injection in the common-rail fuel-injection system of the present invention.

As shown in FIG. 4, a common-rail pressure Prh just before the auxiliary injection for every cylinder and the common-rail pressure Prl just after the end of the auxiliary injection have been previously obtained by appropriately smoothing the common-rail pressures Pr obtained by sampling detection at the pressure sensor 13, and stored in a memory in the controller 12. Now, the common-rail pressures Prh and FPrl are red out from the memory, respectively, for just before and after the auxiliary injection (S10). By comparing the common-rail pressures Prh and Prl, a pressure drop $\Delta Pr$ (=Prh−Prl) is obtained, which causes in the common-rail pressure owing to the auxiliary injection (S11). On the basis of the mapped data shown in FIG. 2, the actual amount Qa of fuel injected in the auxiliary injection is derived from the common-rail pressure Prh just before the auxiliary injection and the pressure drop $\Delta Pr$ of the common-rail pressure (S12). The desired amount Qt of fuel to be injected in the auxiliary injection found in the previous step 3 is stored (S13). Found on the basis of the mapped data in FIG. 1 showing the relationship previously determined between the common-rail pressure Pr and the detectable minimum amount Ql of fuel injected is a set value Qs for the amount of fuel injected corresponding to the common-rail pressure Prh just before the auxiliary injection, that is, the minimum amount Ql of fuel injected in the present embodiment (S14). As an alternative, the set value Qs for the amount of fuel injected may be defined as a value somewhat larger than the minimum amount Ql of fuel injected.

The desired amount Qt of fuel to be injected in the auxiliary injection, which has been stored in the previous step 13, is compared with the minimum amount Ql of fuel injected, which has been calculated in the previous step 14 (S15). When the desired amount Qt of fuel to be injected in the auxiliary injection is not less than the minimum amount Ql of fuel injected, a correction coefficient K (K=Qt'/Qa) is derived from both of a desired amount Qt' of fuel to be injected in the auxiliary injection, which has been stored at the previous step 13 on the execution of the main routine at the latest fuel injection, and an actual amount Qa of fuel injected really in the auxiliary injection in accordance with the desired amount Qt' of fuel in the auxiliary injection (S16). The feedback control using the correction coefficient K corrects the desired amount Qt of fuel to be injected in the auxiliary injection to thereby find a corrected, desired amount Qc (Qc=K×Qt) of fuel in the auxiliary injection (S17). Then, a command pulse width is derived from the mapped data in compliance with the corrected, desired amount Qc of fuel in the auxiliary injection (S18). The actuator 26 of the injector 1 is applied with a driving signal in accordance with the command pulse width to allow the fuel to spray out of the injector 1 (S19).

In contrast, when the desired amount Qt of fuel to be injected in the auxiliary injection is less than the minimum amount Ql of fuel upon comparison at the step 15, the desired amount Qt of fuel to be injected in the auxiliary injection is selected as the corrected, desired amount Qc of fuel in the auxiliary injection and the subsequent steps 19 and 20 are executed in accordance with the corrected, desired amount Qc of fuel in the auxiliary injection, which has been determined as described just above.

Having described above an embodiment in which the correction of the desired amount of fuel to be injected in the auxiliary injection for the current fuel injection cycle is executed by making use of the correction coefficient that is derived in the form of a ratio (Qt'/Qa) of the desired amount Qt' of fuel in the latest auxiliary injection to the actual amount Qa of fuel injected in the current auxiliary injection, the amount of fuel to be injected in the current auxiliary injection may be alternatively corrected in accordance with a deviation ΔQ(Qa−Qt') between the actual amount Qa of fuel injected in the current auxiliary injection and the desired amount QtΔ of fuel in the latest auxiliary injection. That is to say, the command pulse width for any one injector 1 may be altered in compliance with a corrected, desired amount Qc of fuel in the auxiliary injection, which is given by correcting the desired amount Qt of fuel to be injected in the auxiliary injection on the current combustion cycle in accordance with the deviation ΔQ in the same injector. As an alternative, the corrected quantity of the command pulse width may be found in accordance with the deviation ΔQ.

What is claimed is:

1. A common-rail fuel-injection system comprising, a common rail storing therein a pressurized fuel discharged out of a high-pressure fuel pump, injectors for spraying the fuel fed from the common rail into combustion chambers, detecting means for monitoring engine operating conditions, a pressure sensor for monitoring a fuel pressure in the common rail, and a controller for finding a desired amount of fuel to be injected out of the injectors depending on signals from the detecting means and controlling fuel injection out of the injectors in accordance with the desired amount of fuel to be injected, wherein the controller divides the fuel injection out of the injectors into a major injection and an auxiliary injection in accordance with the signals issued from the detecting means, the auxiliary injection being carried out at any one timing either before or after the major injection, finds the desired amount of fuel to be injected in the auxiliary injection in accordance with the signals issued from the detecting means, and further finds an actual amount of fuel injected really in the auxiliary injection on the basis of a pressure drop of the fuel pressure in the common rail, whereby the actual amount of fuel injected in the auxiliary injection is feedback controlled so as to come into coincidence with the desired amount of fuel to be injected in the auxiliary injection, and wherein the controller compares the desired amount of fuel to be injected in the auxiliary injection with a set value, which is found in accordance with the fuel pressure detected at the pressure sensor, and when the desired amount of fuel to be injected in the auxiliary injection is less than the set value, ceases the feedback control.

2. A common-rail fuel-injection system as defined in claim 1, wherein the set value is calculated on the basis of a relationship defined previously between the fuel pressure in the common rail and a minimum amount of fuel injected, which is detectable in response to a pressure variation taking place in the fuel pressure in the common rail, and defined as an amount of fuel to be injected, which is not less than the minimum amount of injected fuel found depending on a signal issued from the pressure sensor.

3. A common-rail fuel-injection system as defined in claim 1, wherein when the desired amount of fuel to be injected in the auxiliary injection is less than the set value, an open-loop control is carried out, in which the desired amount of fuel to be injected in the auxiliary injection serves as the set value.

4. A common-rail fuel-injection system as defined in claim 1, wherein the injector includes a pressure-control chamber applied with a part of the fuel fed from the common rail, a needle valve movable upward and downward, depending on a hydraulic action of the fuel in the pressure-control chamber, to thereby open and close fuel-discharge orifices at a distal end of the injector, a valve for allowing the fuel to discharge out of the pressure-control chamber thereby relieving the fuel pressure in the pressure-control chamber, and an actuator for driving the valve.

5. A common-rail fuel-injection system as defined in claim 4, wherein the controller outputs a command pulse controlling an exciting pulse that is applied to the actuator to open the valve, and corrects a pulse width of the command pulse depending on a deviation between the actual amount of fuel injected in the auxiliary injection and the desired amount of fuel to be injected in the auxiliary injection to thereby execute the feedback control of the auxiliary injection.

* * * * *